US008826272B2

(12) United States Patent
Glikson et al.

(10) Patent No.: US 8,826,272 B2
(45) Date of Patent: Sep. 2, 2014

(54) PLANNING A RELIABLE MIGRATION IN A LIMITED STABILITY VIRTUALIZED ENVIRONMENT

(75) Inventors: Alexander Glikson, Haifa (IL); Assaf Albert Israel, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 12/954,940

(22) Filed: Nov. 29, 2010

(65) Prior Publication Data

US 2012/0137285 A1 May 31, 2012

(51) Int. Cl.
*G06F 9/455* (2006.01)
(52) U.S. Cl.
USPC ............................................ 718/1; 709/226
(58) Field of Classification Search
None
See application file for complete search history.

(56) References Cited

U.S. PATENT DOCUMENTS

| | | | |
|---|---|---|---|
| 6,061,807 A | 5/2000 | Albert et al. | |
| 6,854,115 B1 | 2/2005 | Traversat et al. | |
| 7,093,086 B1 | 8/2006 | van Rietschote | |
| 7,203,944 B1* | 4/2007 | van Rietschote et al. | 718/104 |
| 7,761,573 B2* | 7/2010 | Travostino et al. | 709/226 |
| 8,102,781 B2* | 1/2012 | Smith | 370/252 |
| 8,150,971 B2* | 4/2012 | Lublin et al. | 709/226 |
| 8,370,473 B2* | 2/2013 | Glikson et al. | 709/223 |
| 2007/0079307 A1* | 4/2007 | Dhawan et al. | 718/1 |
| 2007/0192765 A1 | 8/2007 | Shimogawa et al. | |
| 2009/0228589 A1* | 9/2009 | Korupolu | 709/226 |
| 2009/0300605 A1 | 12/2009 | Edwards et al. | |
| 2010/0027420 A1* | 2/2010 | Smith | 370/235 |
| 2010/0071025 A1 | 3/2010 | Devine et al. | |
| 2010/0122248 A1 | 5/2010 | Robinson et al. | |
| 2010/0153514 A1* | 6/2010 | Dabagh et al. | 709/213 |
| 2010/0287548 A1* | 11/2010 | Zhou et al. | 718/1 |
| 2011/0016468 A1* | 1/2011 | Singh | 718/1 |
| 2011/0145816 A1* | 6/2011 | Glikson et al. | 718/1 |
| 2011/0296052 A1* | 12/2011 | Guo et al. | 709/240 |
| 2012/0185856 A1* | 7/2012 | Ashihara et al. | 718/1 |

FOREIGN PATENT DOCUMENTS

WO 2008054996 5/2008

OTHER PUBLICATIONS

Bradford et al., "Live Wide-Area Migration of Virtual Machines Including Locan Persistent State", Deutsche Telekom Laboratories, Jun. 15, 2007; (Bradford_2007.pdf; pp. 1-11).*
Travostino et al. "Seamless live migration of virtual machines over the MAN/WAN", Future Generation Computer Systems; May 11, 2006; (Travostino_2006.pdf; pp. 1-7).*

(Continued)

*Primary Examiner* — Emerson Puente
*Assistant Examiner* — Hiren Patel

(57) ABSTRACT

Systems and methods for reliably migrating a virtual machine (VM) are provided. The method comprises receiving overhead and reliability factors for hosts in a hosting fabric; determining a plurality of viable migration paths for migrating a source VM from a source host to a target host in the hosting fabric, wherein the migration is accomplished through a series of migration phases, wherein a phase involves migration of the source VM from one host to another host in a migration path; determining total overhead costs associated with each migration path; and selecting a migration path from among said plurality of migration paths according to the overhead costs and reliability factors, wherein the reliability of the migration over the selected path is monitored and controlled by dynamically allocating and de-allocating one or more replicas of the source VM on one or more hosts in the migration fabric.

18 Claims, 26 Drawing Sheets

(56) References Cited

OTHER PUBLICATIONS

Máté J. Csorba et al., "Ant System for Service Deployment in Private and Public Clouds", BADS'10, Jun. 11, 2010, Washington, DC, USA. URL:http://portal.acm.org/citation.cfm?id=1809024&coll=GUIDE&dl=GUIDE&CFID=94689641&CFTOKEN=69434830&ret=1#Fulltext.

Nicolas Bonvin et al., "A Self-Organized, Fault-Tolerant and Scalable Replication for Cloud storage", SoCC'10, Jun. 10-11, 2010, Indianapolis, Indiana, USA. URL: http://portal.acm.org/citation.cfm?id=1807162.

H. Andrés Lagar-Cavilla et al., "Snow Flock: Rapid Virtual Machine Cloning for Cloud Computing", EuroSys'09, Apr. 1-3, 2009, Nuremberg, Germany. URL: http://www.scs.stanford.edu/~rumble/papers/LagarCavillaEurosys09.pdf.

* cited by examiner

⟨B⟩[3,0] ⟶ ⟨B,B⟩[3,0] ⟶ ⟨B,C⟩[5,1] ⟶ ⟨B,E⟩[6,2] ⟶
⟨C,E⟩[5,1] ⟶ ⟨C,F⟩[7,2] ⟶ ⟨F⟩[5,0] ⟶ ⟨T⟩[6,0]

<B>[3,0] ⟶ <B,B>[3,0] ⟶ <B,C>[5,1] ⟶ <B,E>[6,2] ⟶
<C,E>[5,1] ⟶ <C,F>[7,2] ⟶ <F>[5,0] ⟶ <T>[6,0]

$\langle B \rangle[3,0] \longrightarrow \langle B,B \rangle[3,0] \longrightarrow \langle B,C \rangle[5,1] \longrightarrow \langle B,E \rangle[6,2] \longrightarrow$
$\langle C,E \rangle[5,1] \longrightarrow \langle C,F \rangle[7,2] \longrightarrow \langle F \rangle[5,0] \longrightarrow \langle T \rangle[6,0]$

US 8,826,272 B2

PLANNING A RELIABLE MIGRATION IN A LIMITED STABILITY VIRTUALIZED ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to the migration of one or more virtualized computing systems and, more particularly, to systems and methods for planning a deterministically reliable migration from one host to another in a computing network environment that supports a virtualized environment.

BACKGROUND

In computing networks, a virtualized environment refers to a collaboration or combination of hardware and software network resources and functionality into a software-based administrative entity. Network virtualization involves platform virtualization, often combined with resource virtualization. Virtual resources are implemented such that the elements or systems that interface with said virtual resources are unaware of the interface requirements for the underlying system components, whether in the form of hardware or software.

Virtualization may, for example, be applied to physical hardware resources by combining multiple physical resources into shared pools. Alternatively, one physical resource can appear as multiple virtual resources. Moreover, virtual resources can have functions or features that are not available in their underlying physical resources. For example, an operating system may be virtualized to behave as if it has the resources of an entire machine under its exclusive control, when in fact a virtualization layer transparently controls the provisioning of said services to the requesting client systems. The virtualization process effectively ensures that the virtual resources are properly shared and supported.

Virtual machines (VMs) may be located within the hardware of a physical resource (i.e., host). Virtualization may be achieved using a virtual machine manager (VMM), also known as a hypervisor. A hypervisor is typically implemented by a layer of code in software or firmware that operates in a privileged environment on the host and interacts with underlying hardware to share its resources dynamically among several operating systems. In some instances, it may be desirable to migrate (i.e., move) a VM from one location (e.g., a first host) to another location (e.g., a second host) in the computing network environment.

A so-called "live" migration is preferably performed without any interruption in the services provided by the migrating VMs. Accordingly, a migration may involve moving one or more VMs among one or more hosts, transparently, without noticeable application downtime. In order to achieve live migration, a source VM is replicated on a target host. The state of the source VM, including the content of RAM memory, registers, states of emulated devices, etc., are transferred to the target host (while the source VM continues running). When the replicated VM is ready, the source VM is suspended and the replica takes over.

Due to technical challenges, a live VM migration is typically limited to a local environment. Within this local environment, the replicated VM is configured to access the same physical storage and the same physical network as the source VM. There are, however, applications that require migration of a VM to remote environments for the purpose of disaster recovery, closer proximity to client systems, or change of hosting vendor, for example.

Remote migration may result in system instability or unavailability of services due to the associated latencies. That is, for example, if the migration distance is too long or the network bandwidth is too limited, latency in provisioning services may be incongruously perceptible. In some instances, network connections may be lost or host systems may fail, either completely interrupting service or severely degrading performance.

Further in long-distance migration scenarios, a VM may be migrated through a series of shorter migration phases. There is risk associated with losing the VM at one of the intermediate migrations due to lower host reliability or loss of connectivity during the shorter migrations. For example, if a VM is to be migrated between two data centers, intermediate data centers that are relatively less reliability may need to be used. Such migration planning without the provisioning of additional reliability factors undesirably increases the risk of failure.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, systems and methods for migrating a virtual machine (VM) are provided. The method comprises receiving overhead and reliability factors for hosts in a hosting fabric; determining a plurality of viable migration paths for migrating a source VM from a source host to a target host in the hosting fabric, wherein the migration is accomplished through a series of migration phases, wherein a phase involves migration of the source VM from one host to another host in a migration path; determining total overhead costs associated with each migration path; and selecting a migration path from among said plurality of migration paths according to the overhead costs and reliability factors, wherein the reliability of the migration over the selected path is monitored and controlled by dynamically allocating and de-allocating one or more replicas of the source VM on one or more hosts in the migration fabric.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

A VM migration from a source host to a target host may be performed by breaking down the migration path or plan to a series of shorter distance migration phases. That is, a series of relatively shorter migrations paths (e.g., hops) may be used, where the maximum length of a hop is dependent upon the nature of the systems and resources involved, as well as the operations serviced by the migrating VM. The hop distance is configured to be sufficiently short so that the migration process is robust.

A robust migration limits or avoids a major interruption of service that exceeds a predefined threshold, and undesirable circumstances that may result in performance degradation and costly recovery actions. To stabilize the migration effort, a migration pathway may be calculated taking into account certain reliability factors. The migration pathway begins at a physical host computer (e.g., source host) where the source VM that is to be migrated initially resides and ends with a target host to which the VM is to be ultimately migrated.

Figure 1A:
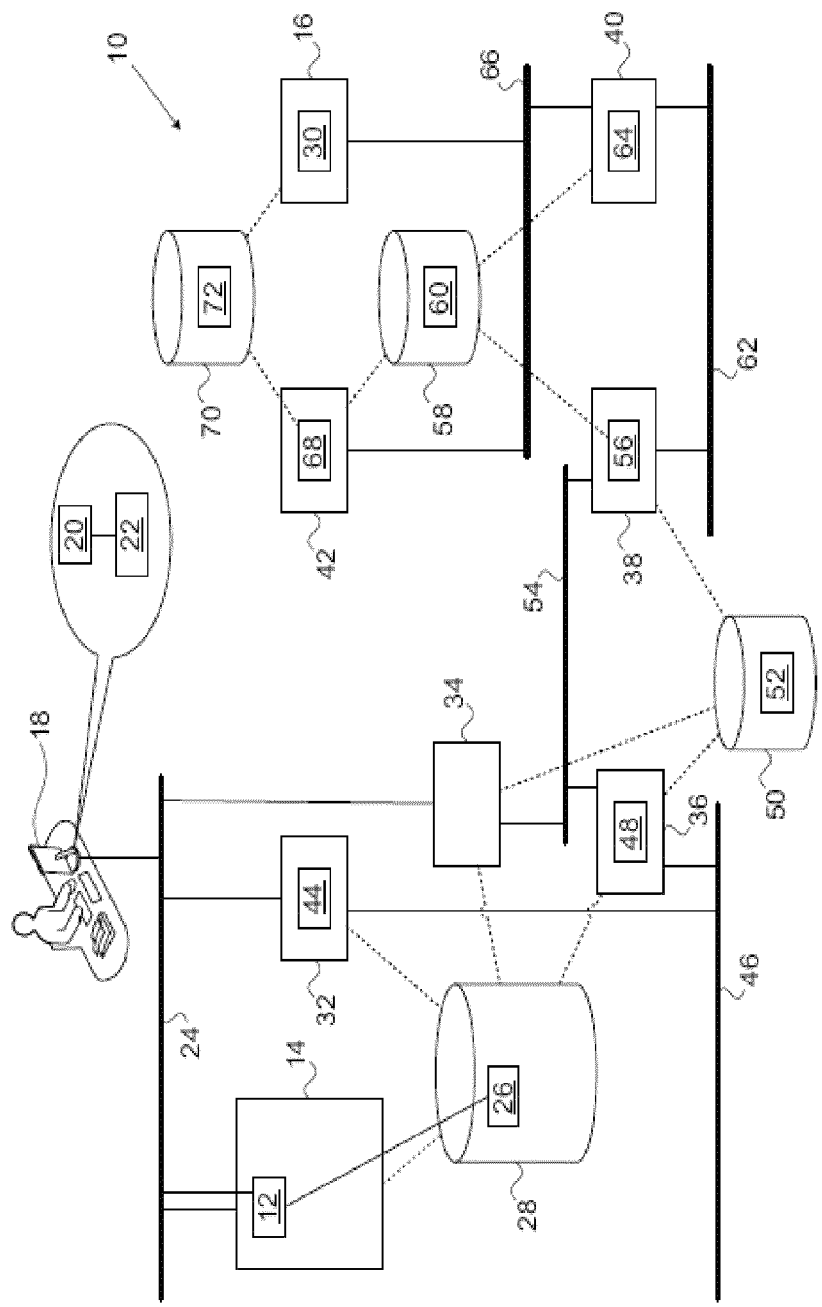
FIG. 1A is an exemplary block diagram of a computing network environment supporting virtualized resources, in accordance with one embodiment.

Referring to FIG. 1A, an exemplary network 10 is illustrated, wherein VM 12 in a source host 14 is designated to migrate to a target host 16. The migration may be initiated and coordinated using a supervisory computing device 18 having a processor 20 and executing programs in a memory 22 for carrying out the respective migration functions and processes. Alternatively, the migration may occur under control of a VMM executing at any suitable host, such as the target host 16.

Figure 1B:
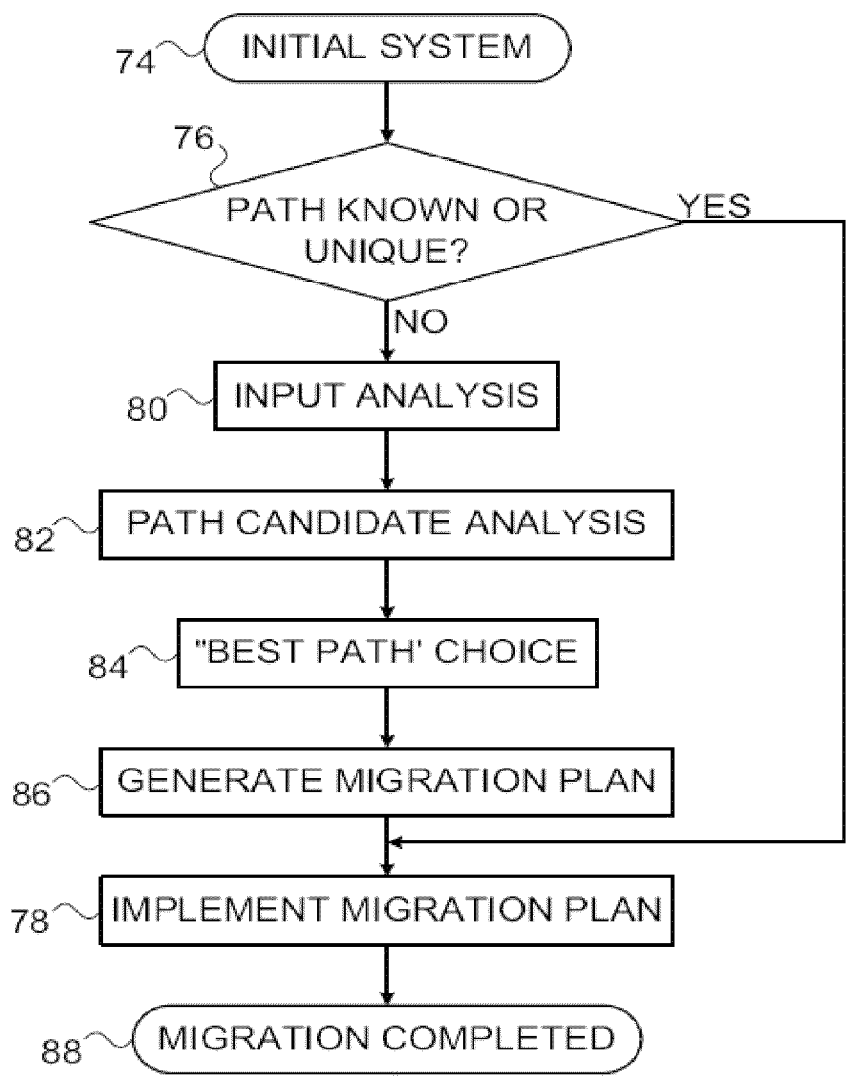
FIG. 1B is an exemplary flow diagram of a method for implementing a long distance migration in shorter distance migration phases, in accordance with one embodiment.

As shown, host 14 is connected to a source network 24 and uses source secondary data 26 located in source storage 28, wherein between the source host 14 and target host 16, there are six candidate intermediate hosts 32, 34, 36, 38, 40, 42, not all of which may fall in the migration path. Referring to FIG. 1B, the migration plan may begin by identifying the initial system (74). The initial system in the example environment shown in FIG. 1A may include VM 12, resources used by VM 12 and the input migration data needed by VM 12 to begin the migration.

In one embodiment, a determination is made whether the migration path is unique or already known (76). A migration plan may be implemented according to a known path (78). If the migration path is not known, then the input migration data is analyzed (80) to determine whether one or more hosts may be used as candidates in a migration path (82). Accordingly, a best migration path is selected (84), and from said selected path a migration plan is generated (86). The migration plan is then implemented (78) and completed (88) barring any unforeseen events.

Referring back to FIG. 1A, the migration method disclosed in FIG. 1B may be used to (1) migrate the source VM 12 from source host 14 to host 32, where it is installed as VM replica 44, (2) migrate the network connection of VM replica 44 from source network 24 to intermediate network 46; (3) migrate the VM replica 44 from host 32 to host 36, thus creating VM replica 48; (4) migrate source secondary data 26 from source storage 28 to intermediate storage 50 where it now becomes intermediate secondary data 52; (5) migrate the network connection of VM replica 44 from intermediate network 46 to intermediate network 54; and (6) migrate VM replica 48 from host 36 to host 38 where it now becomes VM replica 56.

The migration method may be further utilized to (7) migrate intermediate secondary data 52 from intermediate storage 50 to intermediate storage 58 where it now becomes intermediate secondary data 60; (8) migrate the network connection of VM replica 56 from intermediate network 54 to intermediate network 62; (9) migrate VM replica 56 from host 38 to host 40 where it becomes VM replica 64; (10) migrate the network connection of VM 25 copy 64 from intermediate network 62 to target network 66; (11) migrate VM replica 64 from host 40 to host 42 where it becomes VM replica 68; (12) migrate intermediate secondary data 60 from intermediate storage 58 to target storage 70 where it becomes 30 target secondary data 72; and (13) migrate VM replica 68 from host 42 to target host 16, where it becomes target VM 30.

Migrations of a VM and its resources may occur in any order, although there may be times when due to connectivity issues, two or more of the migrations might happen simultaneously. In short, a successful live migration, in accordance with one embodiment, involves at least one of the following processes at one or more migration hops: (a) replication of the VM's state (e.g., memory, registers, etc.) from the source host to the target host; (b) suspension of the initial VM activation of the replica VM; and (c) destruction of the original VM.

In one embodiment, the above migration scheme is enhanced to take into account the technical stability of the migration environment, while the migration is in progress. For example, the system may be configured to determine one or more contingency migration plans, either in advance or in real time, to help maintain a desired reliability level in a situation where a host or a connection failure occurs during migration. The migration plan may be further implemented to assure system stability (e.g., provide for data or host redundancy on independently maintained machines) while the migration is in process, in accordance with one or more embodiments.

During migration, as the source VM moves along a selected migration path, one or more replicas of the source VM may be created to run on different hosts to ensure that a certain level of reliability is maintained, in the event of a failure. The number of replicas may depend on a target reliability or stability factor for the source VM (i.e., primary VM) and the cumulative availability of the replicas (i.e., secondary VMs) which are configured to take over if the primary VM becomes unavailable during migration.

As provided in further detail below, a primary VM may become unavailable regardless of migration, for various reasons (e.g., due to hardware or connectivity failure). While a VM is migrated from the source to the target host along the hops, the chances that the VM will become unavailable increase, due to lower reliability of the hardware or connectivity at the intermediate hops. Accordingly, one or more replicas may be dynamically allocated or de-allocated along a selected migration path, depending on the environment stability factors and the reliability goals for the migration.

For consistency, the replicas may be synchronized with the primary VM using any suitable synchronization method (e.g., Virtual Synchrony or VM High Availability/Fault Tolerance mechanism). As provided in further detail below, frequent data synchronization may be performed, because if the primary VM fails, one of the replicas will be designated to take over as the primary VM and as such needs to be as updated as possible. Additional replicas may be optionally created as needed to maintain or enhance the reliability goal during the migration process. One or more secondary VMs therefore may be configured to replicate the primary VM (i.e., to support data redundancy), so that at least the secondary VM is able to continue servicing the clients of the primary VM, in case of the primary VM's unavailability.

Depending on implementation, redundancy levels may be dynamically changed along the migration path, as needed or as permissible. For example, as provided in further detail below, replica VMs may be concurrently migrated along the path of migration where system bandwidth and resources permit to provide for additional system stability and VM reliability, in case a selected migration plan fails due to unforeseen events, such as a major interruption in the availability of hosts in the migration path. In this manner, the risk of failure in long distance migrations may be reduced, providing for a robust migration experience that promotes VM availability, responsiveness, and data cohesion.

In one embodiment, after a predetermined number of migration hops are completed, or when an external event occurs that affects the reliability of the VM, the configurations of the primary VM and its replicas may be reassessed and adjusted to meet the desirable reliability goals. To achieve the desirable reliability goals, the following information may be taken into account: (1) the hosting fabric's configuration (e.g., availability and resources of the networked hosts, network connectivity and bandwidth, etc.), (2) capacity and constraints associated with the hosts along the migration path, (3) reliability of the hosts and the corresponding components involved in the migration, (4) services and configuration of the source VM, (5) target reliability/stability factors, and (6) the configuration, distance, availability and resources of the target host.

Figure 2A:
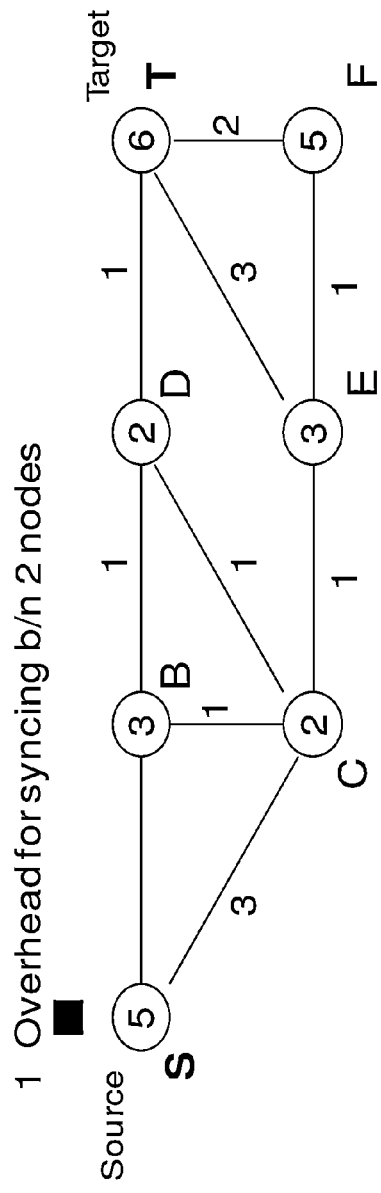
FIGS. 2A through 2N and 2P through 2R illustrate one or more exemplary migration scenarios, in accordance with one embodiment. (It is noteworthy that the figures do not include a view number 2O, which has been intentionally omitted to avoid any confusion with the number twenty (20).
Figure 2B:
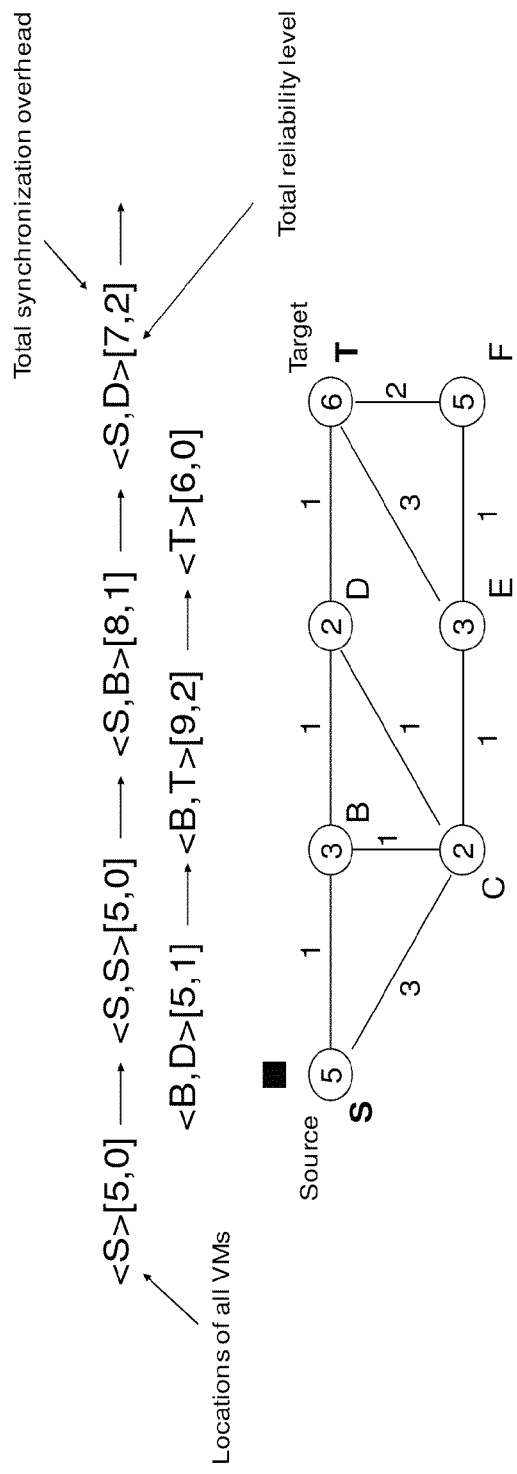
Figure 2C:
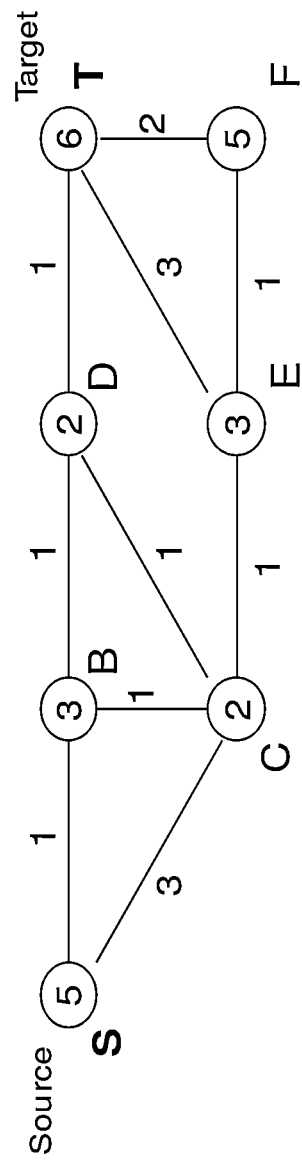

Referring to FIGS. 2A through 2N and 2P through 2R, graphs showing multiple nodes connected by a series of edges are provided to illustrate an exemplary migration scenario, in accordance with one embodiment. As provided in further detail below, in this example, the goal is to migrate the source VM from node S to node T while maintaining a minimum reliability level of 5 (e.g., a data redundancy rate of 5) with minimum overhead on performance and approximately no service interruption. The legend in FIG. 2A shows that a primary VM is designated by a black square and a replica VM is designated by a gray square in this example.

A circular node represents a host machine in the migration fabric that may or may not be utilized, depending on the selected migration strategy. The value indicated inside each circular node is the designated real time reliability level for the respective host. An edge connecting a first node to a second node indicates that if a VM is located on one of the nodes, the VM may successfully migrate to the other node in a hop, for example. The value assigned to an edge between two nodes is an indication of the overhead associated with migrating a VM from one node to the other. The overhead, in one example, may be a value reflecting the physical distance between the two nodes—the term node and host is used interchangeably in this document, unless otherwise disclosed.

Referring to FIGS. 2A to 2D, <S,S>[5,0] represents a configuration or a state in which there are two replicas of the VM being migrated, both residing on host S. More generally stated, the notation <X1, . . . , Xn>[r,s] represent a configuration or a state in which there are <n> copies of the migrating VM (i.e., one being a primary VM copy and the rest being secondary VM replicas), on hosts X1 till Xn correspondingly (could include repetitions). Notations <r> and <s> are the total reliability of all the <n> replicas, and the total cost of keeping them in sync, correspondingly.

Note that each of the replicas is being migrated independently of the other replicas. As provided in further detail below, the transition from <S,S>[5,0] to <S,B>[8,1] means that one of the replicas remained on S, and the second one migrated from S to B. As a result, a configuration was achieved with two replicas, one at S and one at B, having the total reliability increased from 5 to 8, while the total cost to keep them in sync also increased, from 0 to 1 because now each is on a different host, with synchronization cost 1 on the corresponding edge.

Figure 3A:
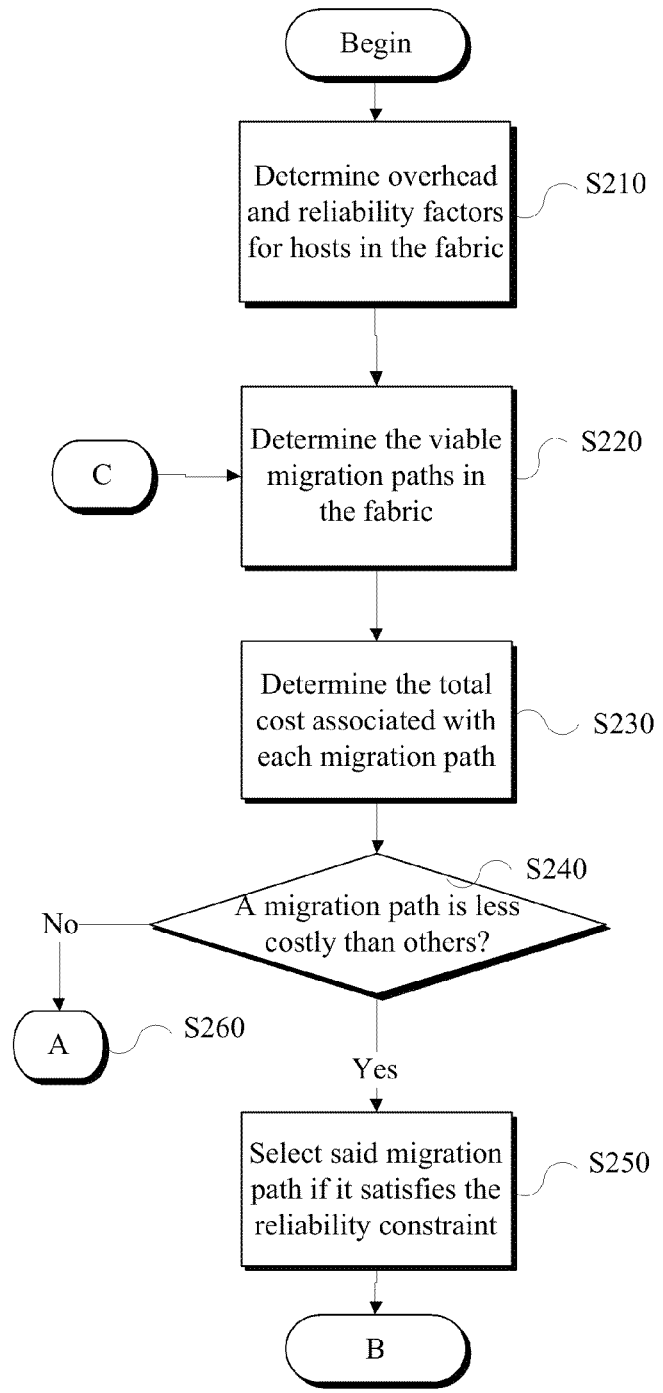
FIGS. 3A and 3B illustrate exemplary methods for determining and executing an optimal migration path, in accordance with one embodiment.
Figure 3B:
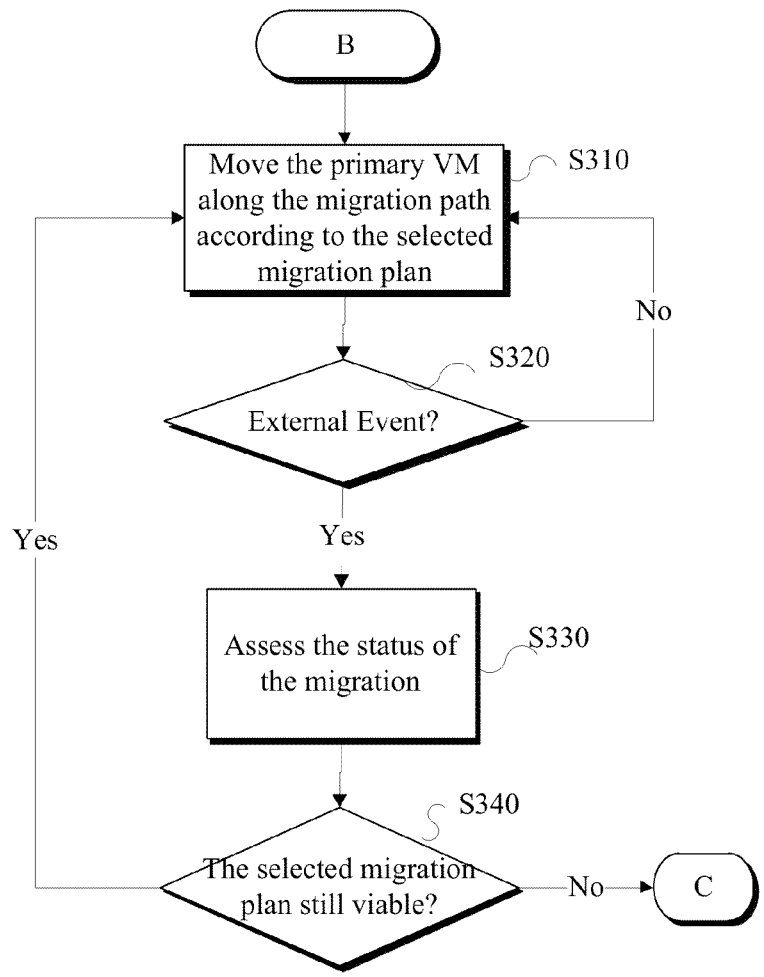

Based on the above methodology, and having access to the cost and reliability data for the hosts in the migration fabric, one or more migration plans or paths may be determined, wherein the cost and reliability level for each path at each migration hop may be calculated in advance. Referring to FIG. 3A, an exemplary method for determining (i.e., calculating) an optimal migration path according to defined reliability constraints is provided. FIG. 3B provides an exemplary method for executing the calculated migration plan, in accordance with one embodiment as provided in further detail below.

A migration planning system, for example, may be utilized to traverse the migration fabric in order to determine the configuration, capabilities and other migration related factors (e.g., reliability, migration costs, overhead, etc.) for the hosts in the migration fabric. Some or all of said information may be provided to the migration planning system in other manners externally, for example. Referring to FIG. 3A, using said information, the overhead and reliability factors associated with the hosts (e.g., node pairs) in the fabric may be determined (S210).

In one implementation, the migration planning system uses said information to determine the possible viable migration paths in the migration fabric that support the source VM's migration from the source node to the target node (S220). One or more candidate migration paths may be detected as the result. The candidate migration paths are examined to determine the total cost associated with migrating the VM via that path (S230). If a migration path is determined to be less costly than the other detected candidate paths (S240), then that path is selected as the optimal migration path, so long as the migration through the selected path satisfies the reliability constraints designated for the VM (S250).

If one or more migration paths are detected that are all equally satisfy the designated migration factors, then one among them may be selected in random, or other factors may be considered to determine which would be the most optimal path. For example, in some embodiments, a selected path may be chosen as the optimal migration path based on factors other than pure migration overhead or reliability constraints. Other factors may include, for example, the network bandwidth along a certain migration path (e.g., allowing for faster migration), or other factors that may affect the success, failure, or the stability of the migration as a whole.

Referring to FIG. 3B, once an optimal migration path or plan is selected, a migration execution system for example may be utilized to migrate the source VM (i.e., the primary VM) from one node to the next along the selected migration path (S310). The migration thus continues along the selected path until an external event occurs (S320). In response, the migration execution system may assess the status of the migration and possibly the viability of the hosts along the remainder of the migration path (S330) to determine if the selected migration plan remains viable (S340). If so, the migration continues (S310) until the primary VM successfully is migrated to the target source.

If the nature of the event is such that it results in an interruption in the migration (e.g., the connection between one or more nodes in the migration path is lost), or otherwise causes an interruption in the provided services (e.g., the host on which the primary VM was executing fails), then an alternate migration path may be determined. Depending on implementation, an alternate migration path may be chosen from a set of migration paths that were previously determined as possible candidates as disclosed above. Alternatively, if the fabric environment has changed since the migration began, it may be desirable to traverse the fabric again to determine and validate a new optimal migration path or other viable candidates.

Figure 2D:
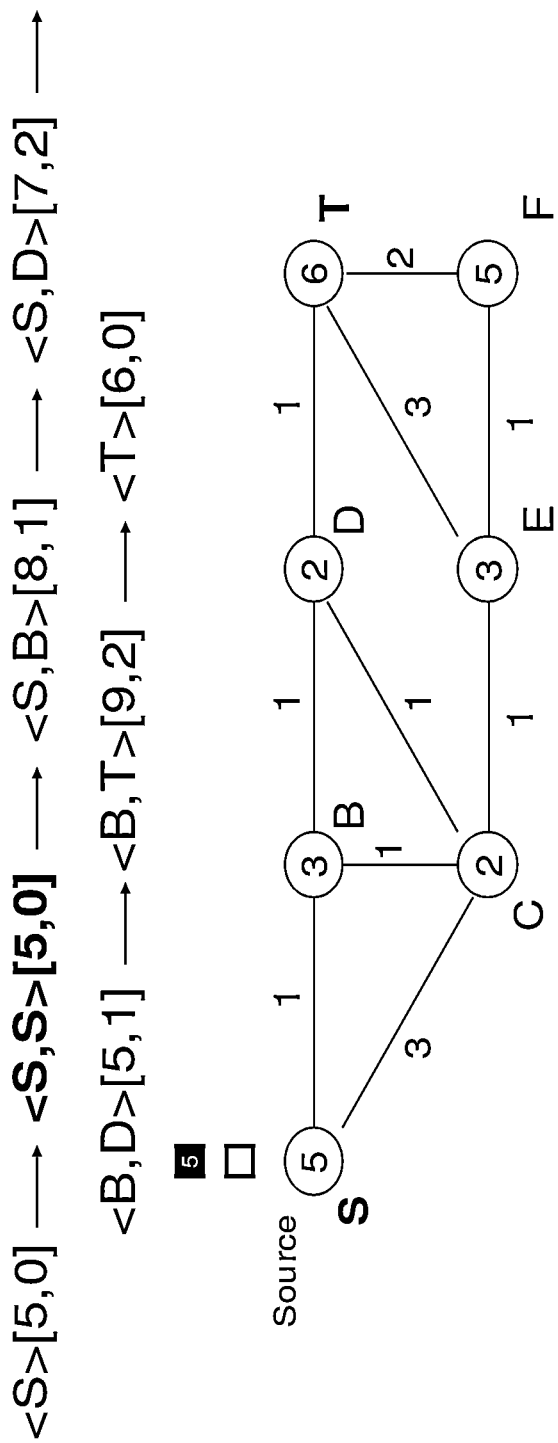

Referring back to FIGS. 2A through 2N and 2P through 2R, an exemplary scenario is illustrated in which a source VM is to be migrated from a source host S to a target host T. According to the above provided migration planning and execution methods, a migration path over the nodes S, B, D and T may be determined to be the optimal migration path. As shown, the chosen path has a cumulative overhead of 3 and satisfies a minimum reliability factor of 5. Referring to FIG. 2D, in one embodiment, a replica VM (e.g., shown as a gray box) may be created on host S. The source VM is shown as a black box with the number 5 inside it—number 5 designates the reliability factor when the VM is hosted on S.

Figure 2E:
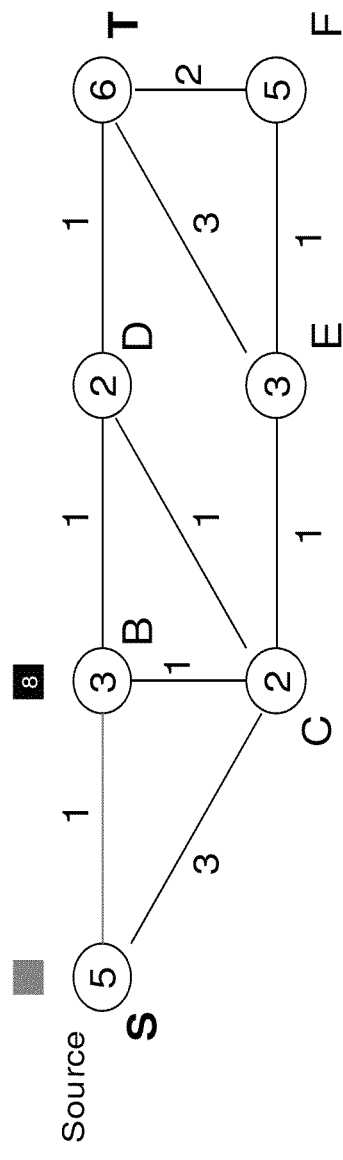
Figure 2F:
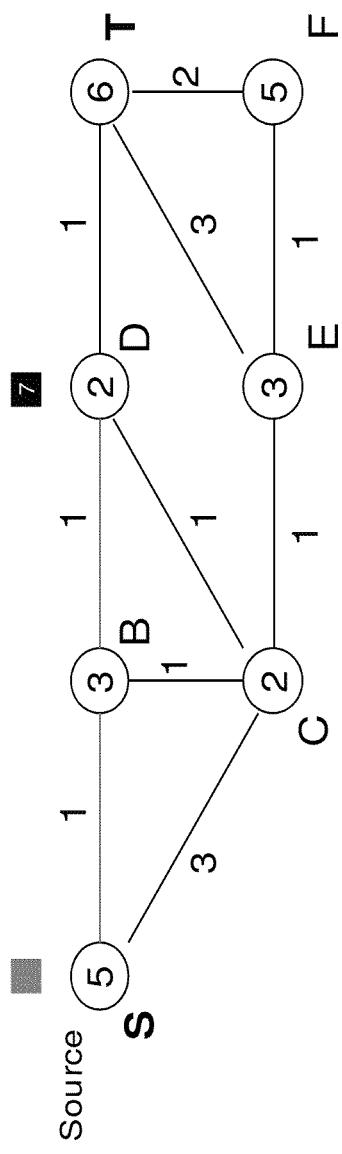

Referring to FIG. 2E, source VM migrates along the selected path from S to B. Once the VM is on host B, the cumulative reliability level is 5+3=8, because the primary VM at host B has a reliability factor of 3, and the replica VM at host S provides an additional reliability factor of 5. As shown in FIG. 2F, primary VM migrates to the next host in the selected migration path, node D. The cumulative reliability factor for the primary VM is now 2+5=7. As provided earlier, in one embodiment, the cumulative reliability factor of the migrating VM is equal to the reliability factor of the host on which the primary VM resides plus the cumulative reliability factor of the hosts on which secondary VM(s) reside.

Figure 2G:
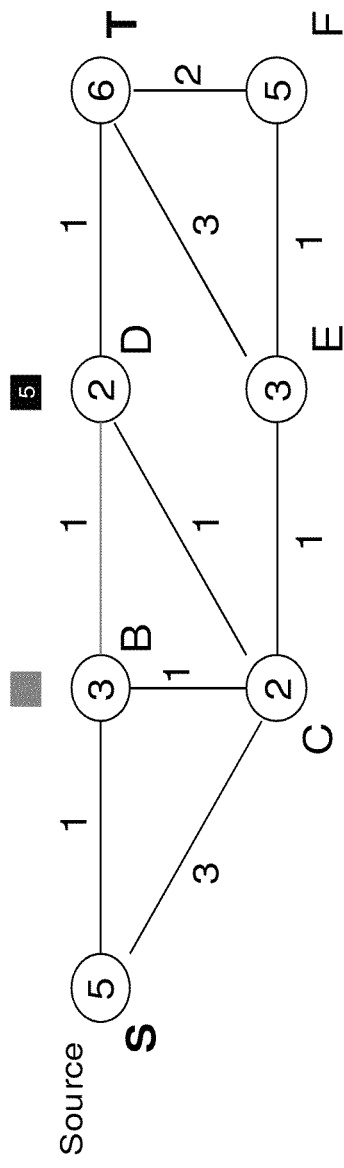

FIG. 2G illustrates an exemplary scenario in which the secondary VM migrates from host S to host B. The migration of the secondary VM closer to the primary VM helps reduce the associated overhead with replacing the primary VM with the secondary VM, should an event occur that such substitution is needed. Further, a closer proximity between the primary VM and the secondary VM(s) reduces the costs associated with the synchronization overhead which may be needed to keep the secondary VM updated in case the primary VM changes during the migration.

Figure 2H:
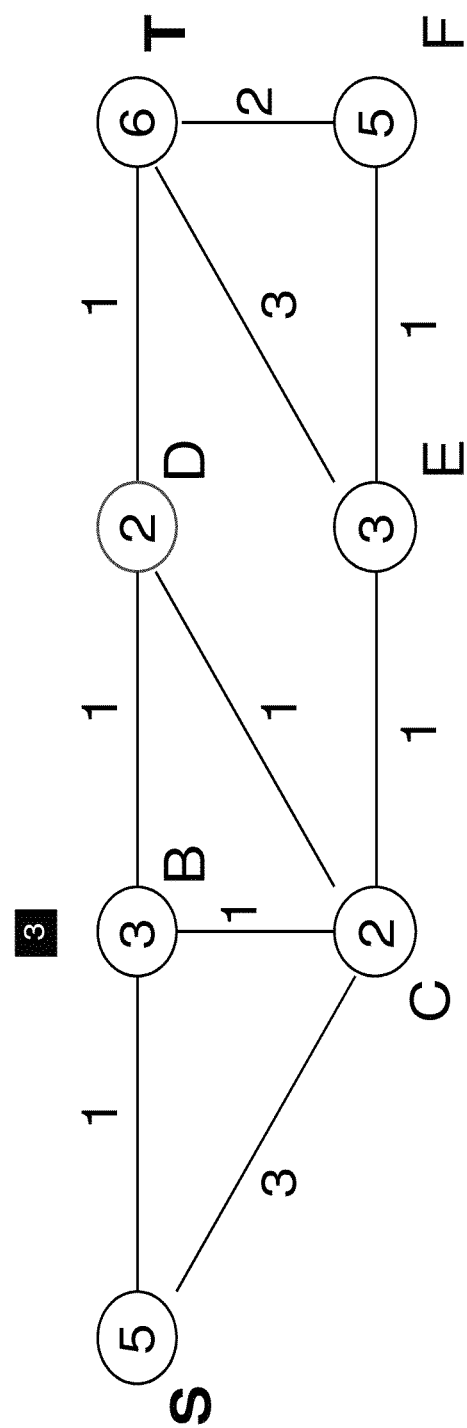
Figure 2I:
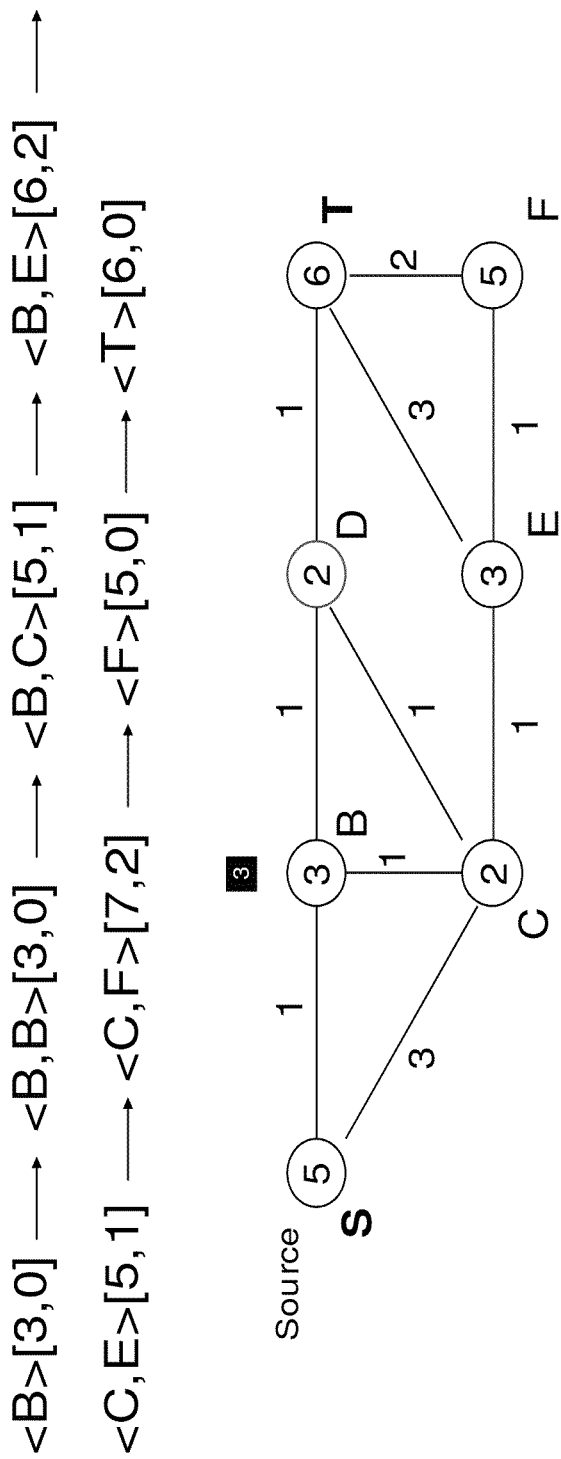
Figure 2J:
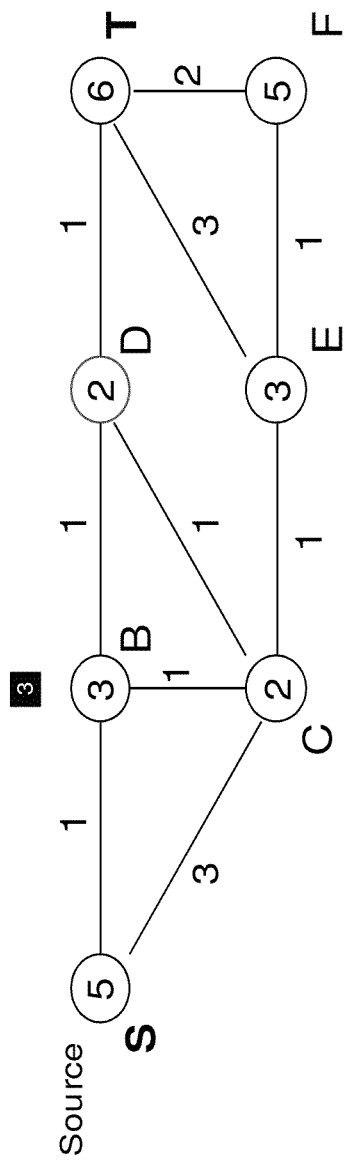
Figure 2K:
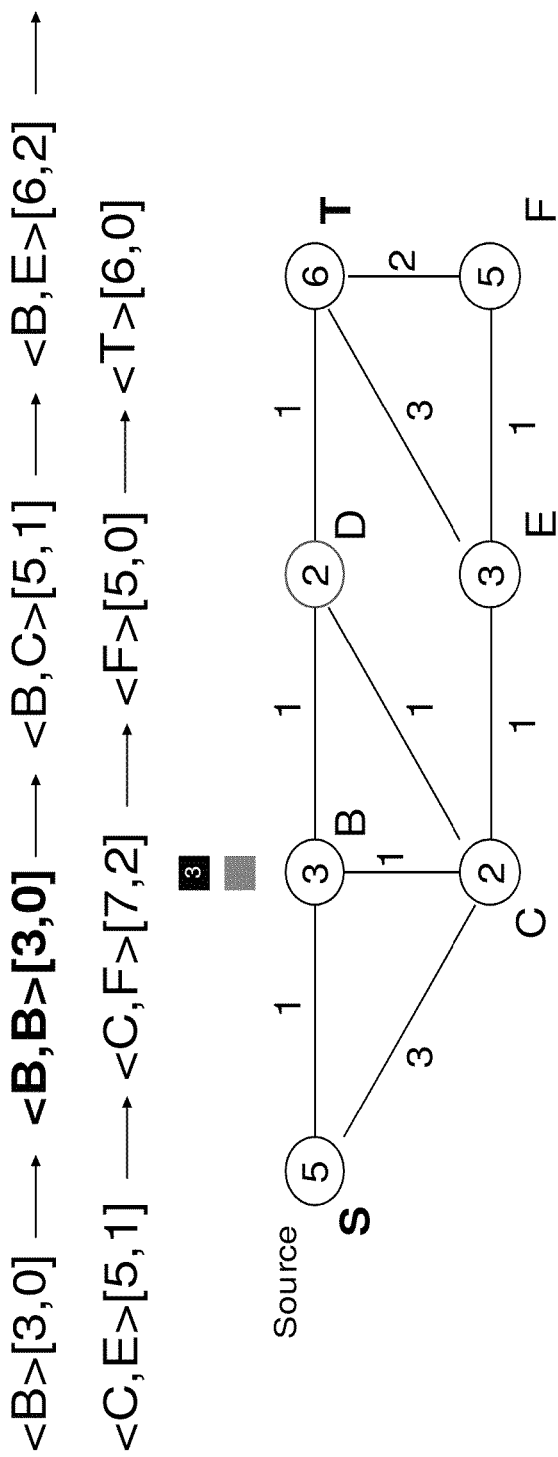
Figure 2L:
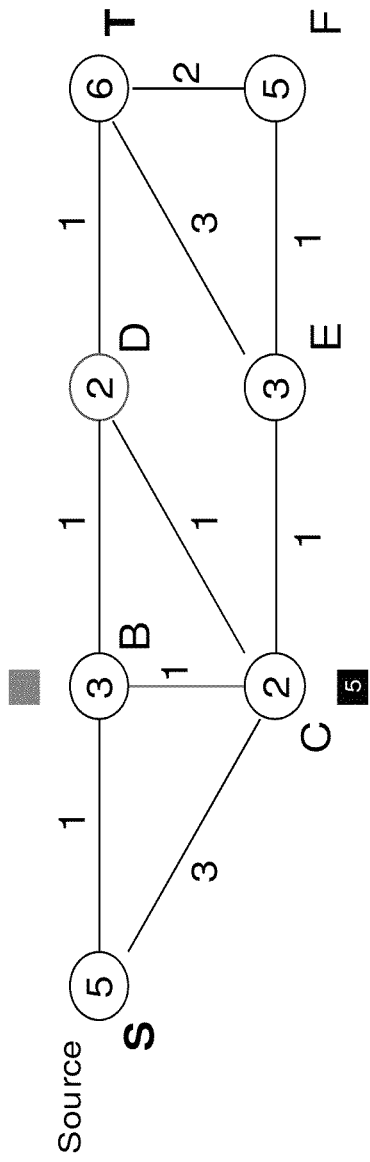
Figure 2M:
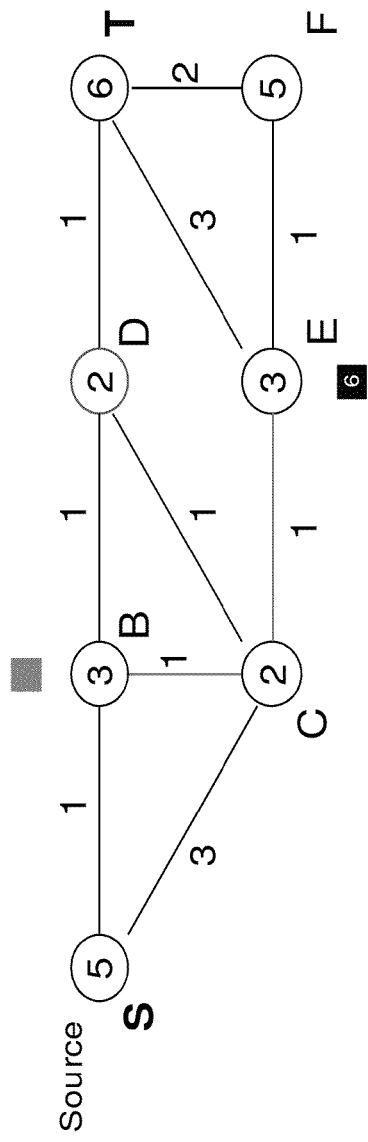
Figure 2N:
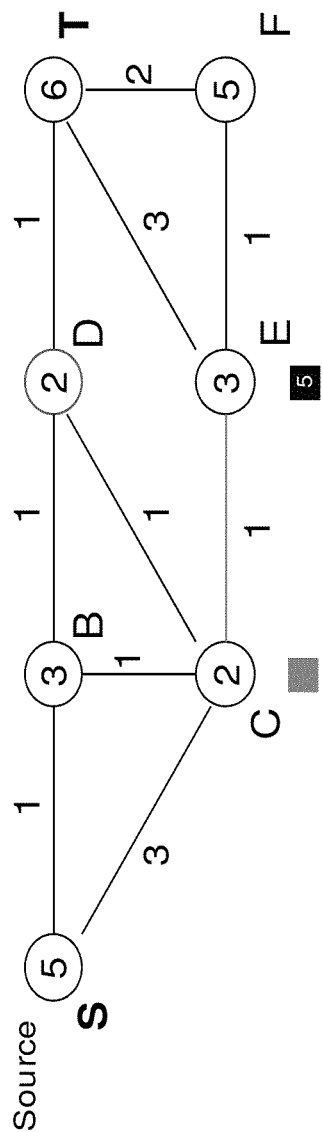

FIG. 2H is the illustration of a scenario where host D on which the primary VM was operating fails and as the result the secondary VM residing on host B takes over, according to one embodiment. It is noteworthy that in this scenario, after the takeover is implemented (i.e., when VM on node B assumes the role of primary VM), the primary VM's reliability factor is 3 and below the exemplary desirable threshold of 5. Referring to FIGS. 2I to 2L, to continue the migration process, an alternative migration path is determined along the path that includes nodes B, C, E, F and T. Note that the reliability factor issue is remedied by way of creating a secondary VM on host B and moving the primary VM to host C.

Figure 2P:
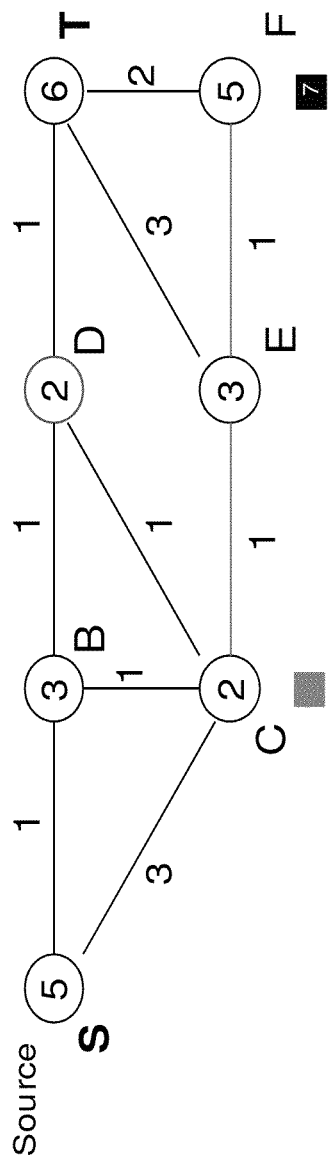

It is noteworthy that the secondary VM may be created on any host other than host B. However, for the purpose of efficiency, creation of the VM on host C may be more appropriate (e.g., a copy-on-write process may be utilized to create an instant copy of the source VM on host B). Referring to FIGS. 2M to 2P, primary VM and the secondary VM may continue to migrate according to the new plan of migration to hosts F and C, respectively. Note that the cumulative reliability factor illustrated in FIG. 2P is 2+5=7, with host F having a reliability factor (i.e., 5) which is equal to the minimum reliability factor 5 designated for this migration.

Figure 2Q:
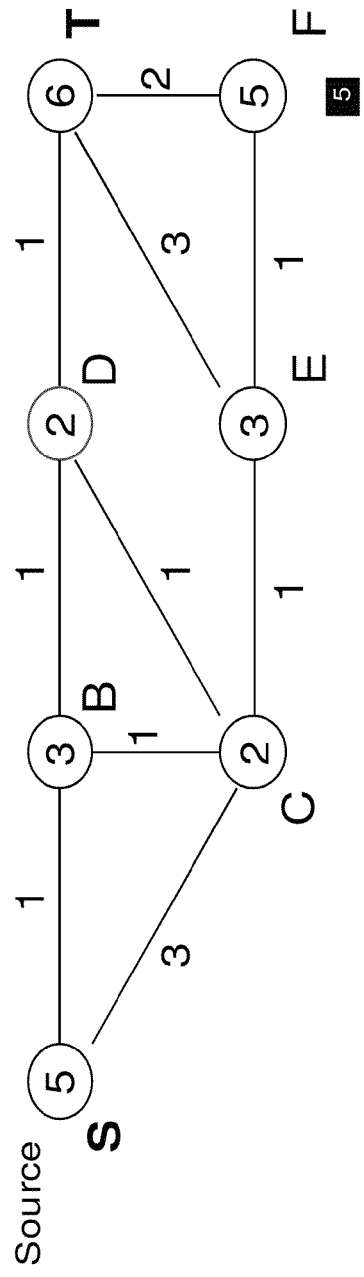

In one embodiment, the reliability factor at each hop or stage of migration may be revisited. And, for example, if the reliability factor of host on which the primary VM resides is equal or greater than the designated minimum reliability factor then the secondary VM(s), if not needed for other purposes, may be removed or destroyed. In the exemplary scenario disclosed here, FIG. 2Q illustrates an instance where secondary copy which was located on host C is removed. Such action may help reduce the overhead costs associated with maintaining the secondary VM(s), and also eliminate or reduce the associated costs with synchronization of data between the secondary VM(s) and the primary VM.

Figure 2R:
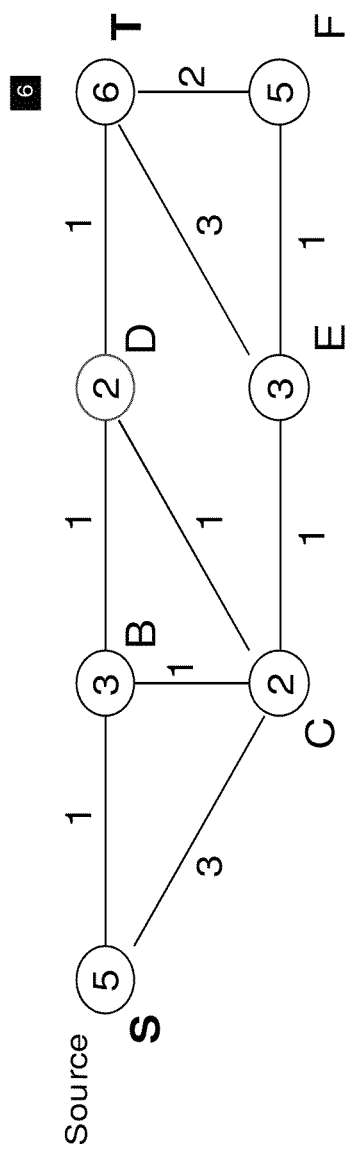

FIG. 2R illustrates the final migration hop from host F to host T, where the final reliability level is 6. Not that due to the failure of host D during the migration process, the total overhead associated with the successful migration from host S to host T is 8 (i.e., 1+1+1+1+1+1+2=8 where the secondary migration path lies along the nodes S, B, D, B, C, E, F, T) instead of the initially calculated cost of 3 associated with the initially selected migration path along the nodes S, B, D and T. Never-the-less, a complete migration from the source host to the target host is achieved, albeit at higher costs, but successfully while meeting the minimum reliability level.

In this disclosure the terms cost and reliability and equivalent terminology has been used to define dynamically changing values associate with several factors that are dependent on the infrastructure of the network fabric over which the migration of VMs is planned. For example, without limitation, the term 'cost' may refer to one or more or a combination of the following: cost of migrating a VM from one node to the next node, or from one node to the target node, the cost of migration in a selected migration path, the cost of recovery (e.g., replacing a primary VM) in case of failure, and the cost of synchronization or maintenance of secondary VMs.

The term 'reliability' may, for example, refer to factors that may be used to understand and define the level of stability that may be achieved by way of creating multiple replicas of a VM, the frequency of synchronization among primary and replica VMs, distance and connectivity dynamics between hosts supporting the migration, or determining the level of reliability associated with different hardware or software components of a host machine for one or more VMs, or the overall reliability of a selected migration path, etc., without limitation.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
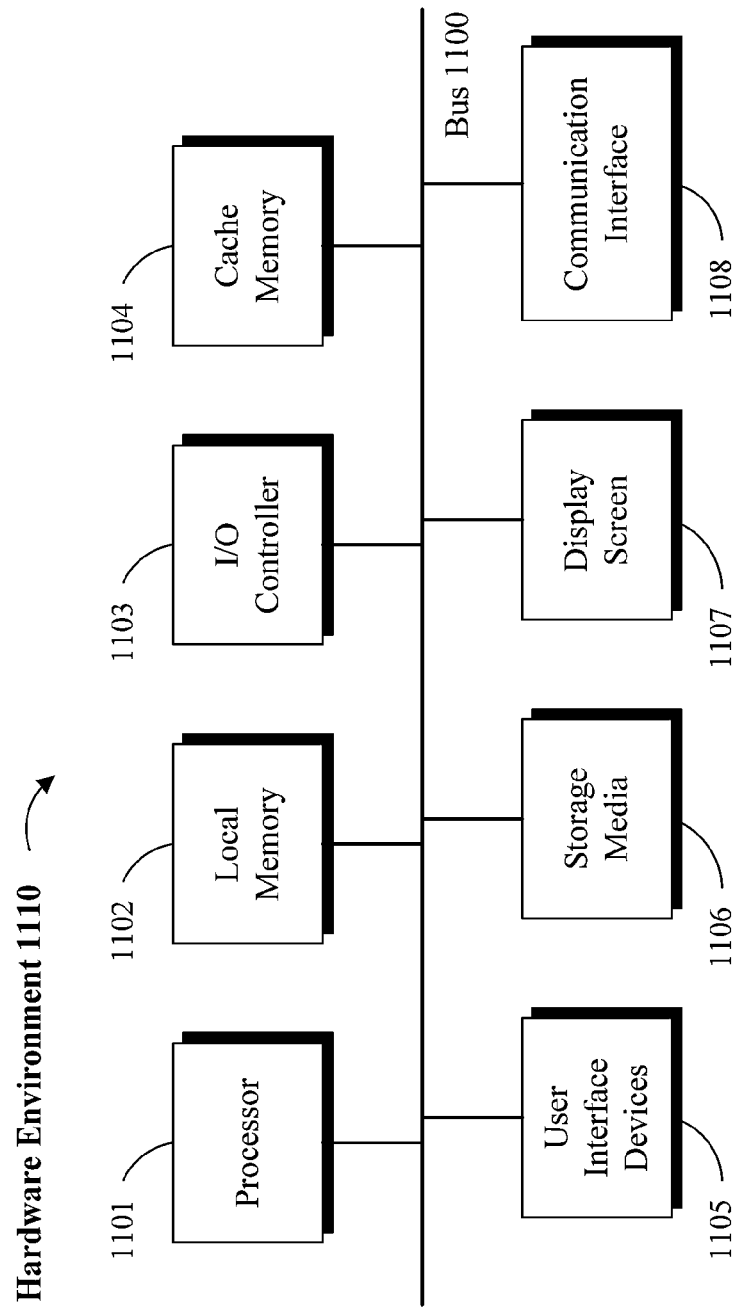
FIGS. 4A and 4B are block diagrams of hardware and software environments in which the disclosed systems and methods may operate, in accordance with one or more embodiments.
Figure 4B:
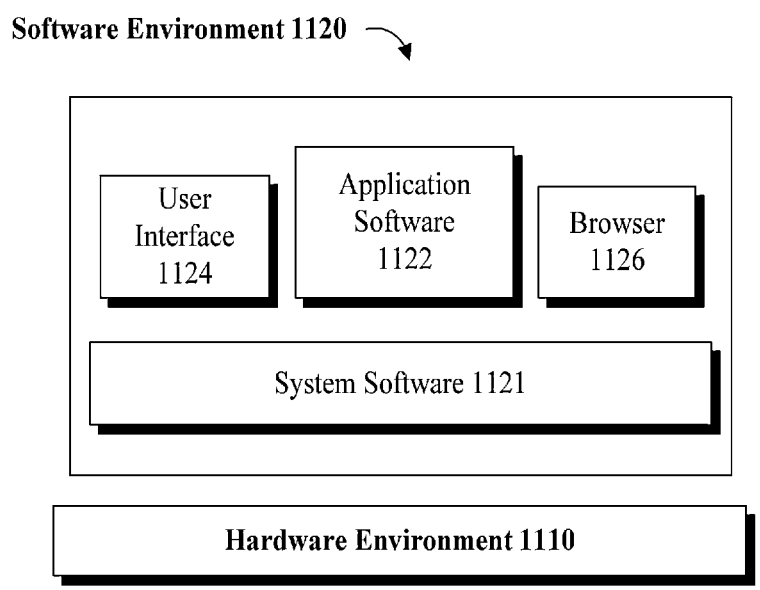

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 5A:
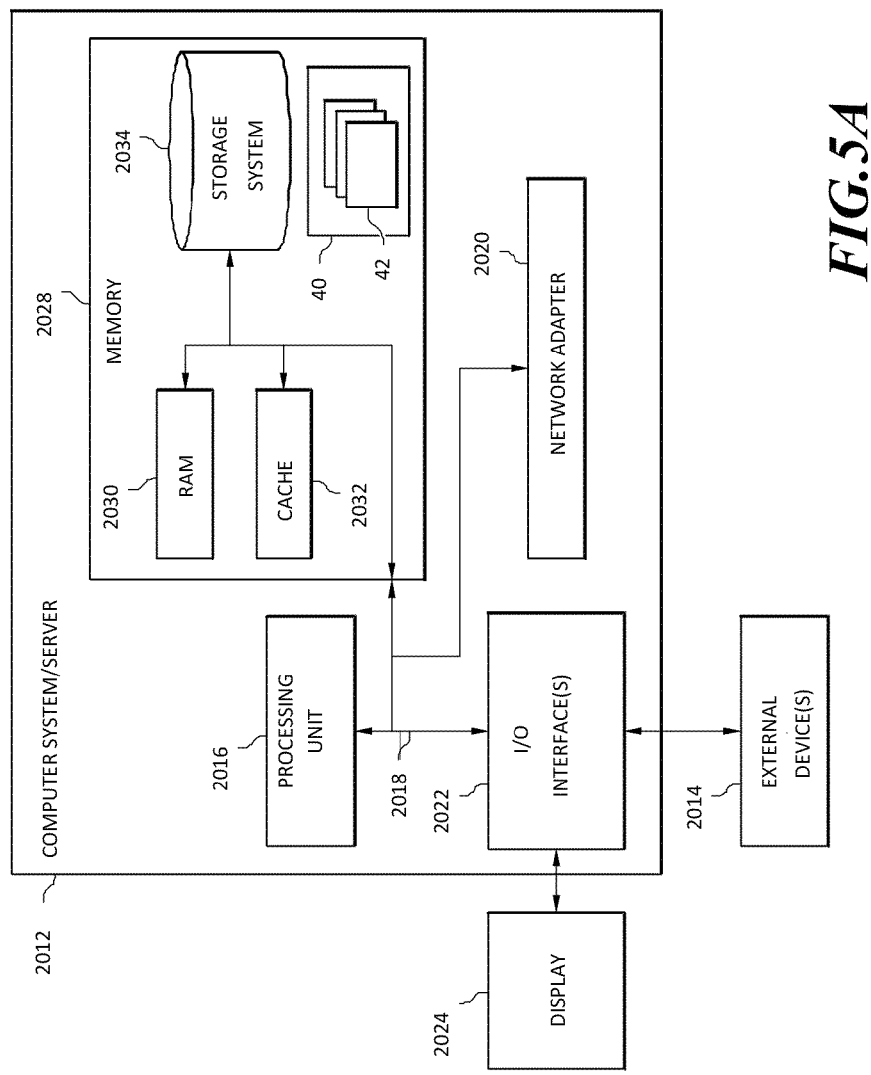
FIG. 5A depicts a cloud computing node according to one embodiment.

A cloud computing environment is service oriented with a focus on statelessness, low coupling, modularity, and semantic interoperability. At the heart of cloud computing is an infrastructure comprising a network of interconnected nodes. Referring now to FIG. 5A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 5B:
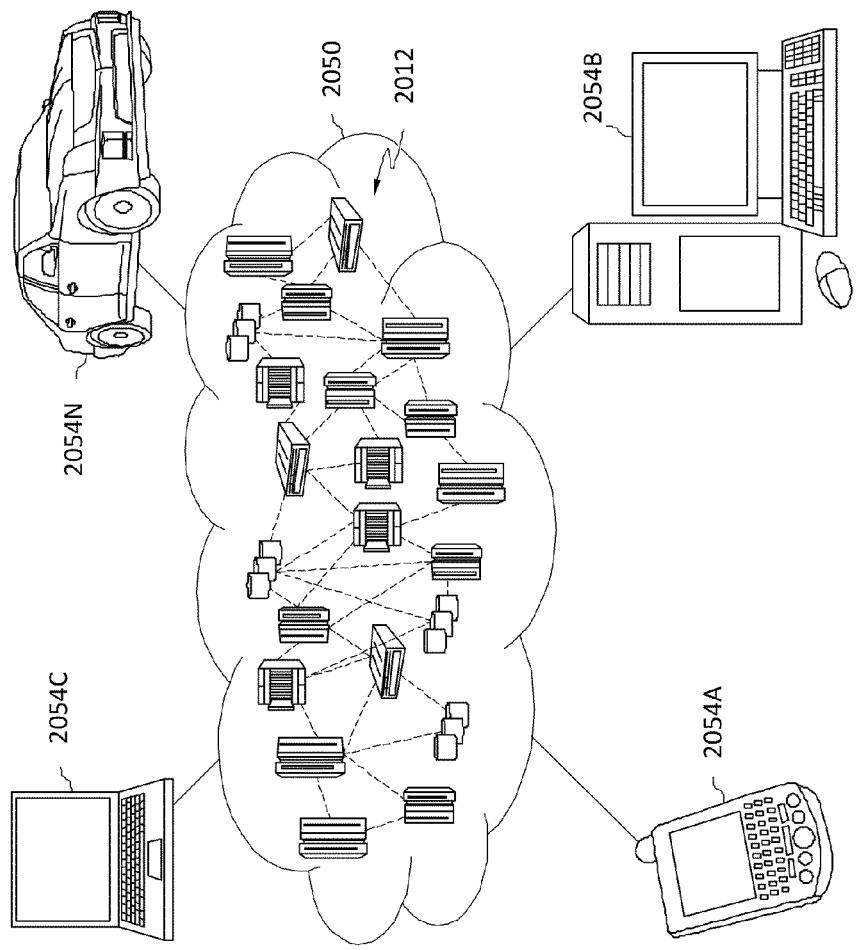
FIG. 5B depicts a cloud computing environment according to one embodiment.

Referring now to FIG. 5B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 5B are intended to be illustrative only and that computing nodes 2010 and cloud computing environment 2050 may communicate with any type of computerized device over any type of network and/or network addressable connection (e.g., using a web browser).

Figure 5C:
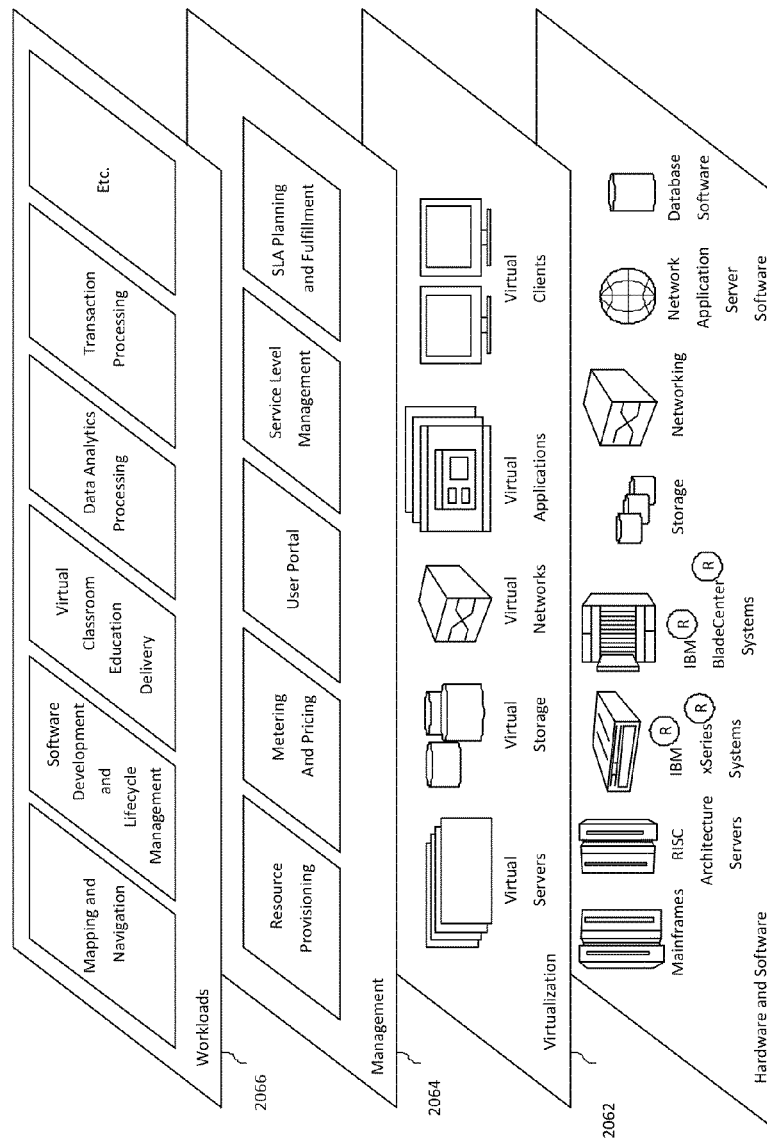
FIG. 5C depicts abstraction model layers according to one embodiment.

Referring now to FIG. 5C, a set of functional abstraction layers provided by cloud computing environment 2050 (FIG. 5B) is shown. It should be understood in advance that the components, layers, and functions shown in FIG. 5C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for reliably migrating a virtual machine (VM), the method comprising:
   receiving overhead and reliability factors for hosts in a hosting fabric;
   determining a plurality of viable migration paths for migrating a source VM from a source host to a target host in the hosting fabric, wherein the migration is accomplished through a series of migration phases, wherein a phase involves migration of the source VM from one host to another host in a migration path;
   determining total overhead costs associated with one or more migration paths; and
   selecting a migration path from among said plurality of viable migration paths according to the overhead costs and reliability factors, such that reliability goals defined for the migration of the source VM are best satisfied considering the overhead associated with the selected migration path,
   wherein the reliability of the migration over the selected migration path is monitored and controlled by dynamically allocating and de-allocating a plurality of replicas of the source VM on one or more hosts in the migration fabric, wherein the plurality of replicas of the source VM run concurrently with the source VM to satisfy the reliability goals defined for the migration of the source VM over multiple hops in the selected migration path, until the source VM is successfully migrated to the target host, and
   wherein number of replicas of the source VM running concurrently during the migration is increased when a migration goal requires more stable migration environment, and wherein the number of replicas of the source VM running concurrently during the migration is decreased when the migration goal requires less stable migration environment.

2. The method of claim 1, wherein the selected migration path provides the least costly migration option.

3. The method of claim 1, wherein the selected migration path provides the most reliable migration option.

4. The method of claim 1, wherein the selected migration path provides the combined least costly and most reliable migration option.

5. The method of claim 1, wherein the migration goal for the migration of the source VM is defined according to a minimum reliability threshold.

6. The method of claim 5, wherein the number of replicas for the source VM during the migration is adjusted to meet the migration goal.

7. The method of claim 1, wherein the replicas of source VM are synchronized with the source VM during the migration.

8. The method of claim 1, further comprising:
   selecting an alternate migration path, in response to determining that the selected migration path is no longer viable.

9. A system for reliably migrating a virtual machine (VM) from a source host to a target host, the system comprising:
   a logic unit for receiving overhead and reliability factors for hosts in a hosting fabric;
   a logic unit for determining a plurality of viable migration paths for migrating a source VM from a source host to a target host in the hosting fabric, wherein the migration is accomplished through a series of migration phases, wherein a phase involves migration of the source VM from one host to another host in a migration path;
   a logic unit for determining total overhead costs associated with one or more migration paths; and
   a logic unit for selecting a migration path from among said plurality of viable migration paths according to the overhead costs and reliability factors, such that reliability goals defined for the migration of the source VM are best satisfied considering the overhead associated with the selected migration path,
   wherein the reliability of the migration over the selected migration path is monitored and controlled by dynamically allocating and de-allocating a plurality of replicas of the source VM on one or more hosts in the migration fabric, wherein the plurality of replicas of the source VM run concurrently with the source VM to satisfy the reliability goals defined for the migration of the source VM over multiple hops in the selected migration path, until the source VM is successfully migrated to the target host, and
   wherein number of replicas of the source VM running concurrently during the migration is increased when a migration goal requires more stable migration environment, and wherein the number of replicas of the source VM running concurrently during the migration is decreased when the migration goal requires less stable migration environment.

10. The system of claim 9, wherein the selected migration path provides the least costly migration option.

11. The system of claim 9, wherein the selected migration path provides the most reliable migration option.

12. The system of claim 9, wherein the selected migration path provides the combined least costly and most reliable migration option.

13. The system of claim 9, wherein the migration goal for the migration of the source VM is defined according to a minimum reliability threshold.

14. The system of claim 13, wherein the number of replicas for the source VM during the migration is adjusted to meet the migration goal.

15. The system of claim 9, further comprising:
   a logic unit for selecting an alternate migration path, in response to determining that the selected migration path is no longer viable.

16. A computer program product comprising a non-transitory data storage medium having a computer readable program, wherein the computer readable program when executed on a computer causes the computer to:

receive overhead and reliability factors for hosts in a hosting fabric;

determine a plurality of viable migration paths for migrating a source VM from a source host to a target host in the hosting fabric, wherein the migration is accomplished through a series of migration phases, wherein a phase involves migration of the source VM from one host to another host in a migration path;

determine total overhead costs associated with one or more migration paths; and select a migration path from among said plurality of viable migration paths according to the overhead costs and reliability factors, such that reliability goals defined for the migration of the source VM are best satisfied considering the overhead associated with the selected migration path, wherein the reliability of the migration over the selected migration path is monitored and controlled by dynamically allocating and de-allocating a plurality of replicas of the source VM on one or more hosts in the migration fabric, wherein the plurality of replicas of the source VM run concurrently with the source VM to satisfy the reliability goals defined for the migration of the source VM over multiple hops in the selected migration path, until the source VM is successfully migrated to the target host, and wherein number of replicas of the source VM running concurrently during the migration is increased when a migration goal requires more stable migration environment, and wherein the number of replicas of the source VM running concurrently during the migration is decreased when the migration goal requires less stable migration environment.

17. The computer program product of claim 16, wherein the selected migration path provides the least costly migration option.

18. The computer program product of claim 16, wherein the selected migration path provides the most reliable migration option.

* * * * *